United States Patent

Kerr et al.

Patent Number: 5,838,345
Date of Patent: Nov. 17, 1998

[54] APPARATUS FOR MAINTAINING THE POSITIONAL RELATIONSHIP OF A PRINT HEAD

[75] Inventors: Roger S. Kerr, Brockport; Edward P. Furlani, Lancaster; Svetlana Reznik, Rochester, all of N.Y.

[73] Assignee: Eastman Kodak Company, Rochester, N.Y.

[21] Appl. No.: 667,775

[22] Filed: Jun. 21, 1996

[51] Int. Cl.⁶ ...................................................... B41J 23/00
[52] U.S. Cl. ............................. 347/37; 347/245; 347/263
[58] Field of Search .................................. 347/263, 245, 347/37; 346/139 R

[56] References Cited

U.S. PATENT DOCUMENTS

| | | | |
|---|---|---|---|
| 3,907,090 | 9/1975 | Northfield et al. | 197/1 |
| 4,197,550 | 4/1980 | Held | 346/29 |
| 4,660,055 | 4/1987 | Enda | 346/139 |
| 5,195,836 | 3/1993 | Longust et al. | 400/354 |
| 5,260,714 | 11/1993 | Decook et al. | 346/76 |
| 5,264,867 | 11/1993 | DeCook et al. | 346/76 |
| 5,270,731 | 12/1993 | Kerr et al. | 346/24 |
| 5,276,464 | 1/1994 | Kerr et al. | 346/134 |
| 5,278,579 | 1/1994 | Kerr et al. | 346/76 |
| 5,301,099 | 4/1994 | Kerr | 346/138 |
| 5,575,577 | 11/1996 | Kawakami et al. | 400/705.1 |

*Primary Examiner*—Safet Metjahic
*Assistant Examiner*—Christopher E. Mahoney
*Attorney, Agent, or Firm*—Peyton C. Watkins

[57] ABSTRACT

An apparatus for maintaining the positional relationship of a print head in a lathe bed scanner, the apparatus comprises a first bar for supporting the print head of the lathe bed scanner. A magnet is positioned adjacent the first bar for magnetically attracting the first bar which, in turn, maintains the positional relationship of the bar and, consequently, the print head.

5 Claims, 4 Drawing Sheets

APPARATUS FOR MAINTAINING THE POSITIONAL RELATIONSHIP OF A PRINT HEAD

FIELD OF THE INVENTION

The invention relates generally to the field of lathe bed scanners utilizing a print head for writing onto a medium positioned on an imaging drum and, more particularly, to such print heads which are supported by a bar that is maintained in a substantially parallel to the axis of the imaging drum by a plurality of magnets.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing element, in which a donor transfers a dye to the thermal print medium upon a sufficient amount of thermal energy. This printer includes a plurality of diode lasers which can be individually modulated to supply energy to selected areas of the medium in accordance with an information signal. The print head of the printer includes one end of a fiber optic array having a plurality of optical fibers coupled to the diode lasers. The thermal print medium is supported on a rotatable imaging drum, and the print head with the fiber optic array is movable relative to the longitudinal axis of the drum. The dye is transferred to the thermal print medium as the radiation, transferred from the diode lasers to the donor element by the optical fibers, is converted to thermal energy in the donor element.

For permitting relative movement of the print head, the print head is placed on a rotatable lead screw having a threaded shaft. The lead screw rests between two sides of the frame of the scanner where it is supported on both ends by bearings. At the drive end, the lead screw continues through the bearing, through a pair of spring retainers that are separated and loaded by a compression spring and to a drive motor. The drive motor induces rotation to the screw, and the compression spring functions to limit axial movement of the lead screw.

The print head is attached to the threaded shaft of the lead screw by a drive nut which is configured to move the print head along the threaded shaft as the lead screw is rotated by the drive motor. The lateral movement of the print head is controlled by switching the direction of the rotation of the lead screw.

Two translation rods that are substantially straight along their longitudinal axis are positioned parallel to the lead screw and, consequently, to each other for forming a plane, along with the lead screw, on which the print head rests. The translation rods are, in turn, supported by the frame with the rods positioned therebetween for permitting low friction movement of the print head.

Although the presently known and utilized scanner is satisfactory, it is not without drawbacks. Procuring rods that are substantially straight is costly due to the fact that commercially available rods include a curvature that is not within a predetermined tolerance and, consequently, are unusable. Therefore, specially procured rods are required to meet the predetermined tolerance which is obviously costly and time consuming.

Therefore, a need exists for improvements in the construction of the lathe bed scanner so as to overcome the above-described drawbacks.

SUMMARY OF THE INVENTION

The present invention is directed to overcoming one or more of the problems set forth above. Briefly summarized, according to one aspect of the present invention, the invention resides in an apparatus for maintaining the positional relationship of a print head in a lathe bed scanner, the apparatus comprising a first bar for supporting the print head of the lathe bed scanner; and a magnet disposed adjacent the bar for magnetically attracting the bar which, in turn, maintains the positional relationship of the bar and, consequently, the print head.

It is an object of the present invention to overcome the above-described drawbacks.

It is an advantage of the present invention to provide a cost-efficient device for implementing the present invention.

It is a feature of the present invention to provide a magnet disposed adjacent a bar for magnetically attracting the bar which, in turn, maintains the positional relationship of the bar and, consequently, the print head.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
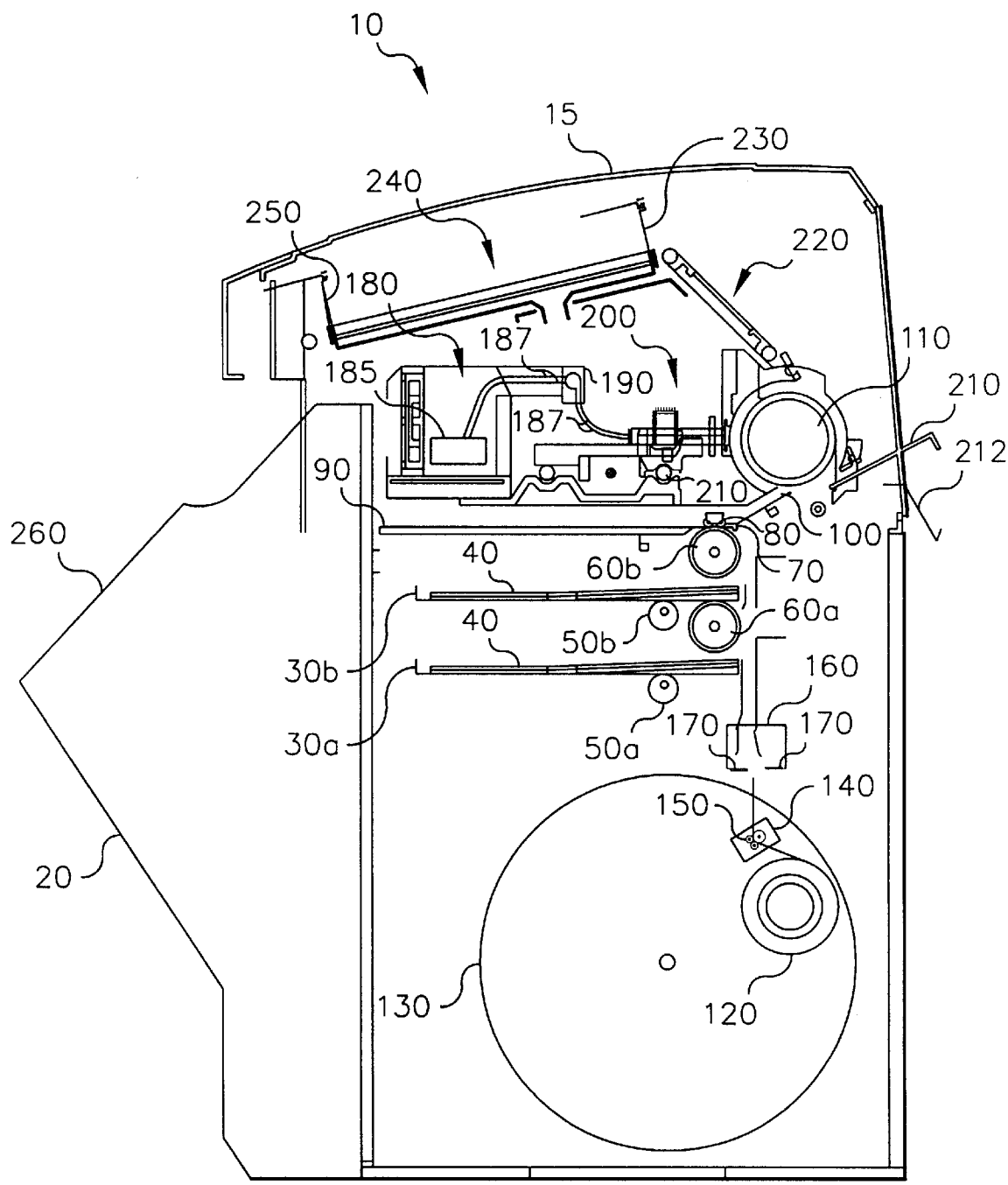
FIG. 1 is a side view in vertical cross section of a lathe bed scanner of the present invention.

Referring to FIG. 1, there is illustrated a lathe bed scanner 10 of the present invention having a housing 15 for forming a protective cover. A movable, hinged door 20 is attached to a front portion of the housing 15 for permitting access to two media trays, a lower tray 30a and upper tray 30b, that are positioned in an interior portion of the housing 15 for supporting receiver material 40, typically paper, thereon. It is obvious to those skilled in the art that only one media tray 30 will dispense receiver material 40 out of its paper tray 30 for creating an image thereon; the alternate media tray 30 either holds an alternative type of paper or functions as backup. In this regard, the lower media tray 30a includes a cam 50a for lifting the paper 40 upwardly toward a rotatable, lower media roller 60a and, ultimately, toward a second rotatable, upper media roller 60b which, when both are rotated, permits the receiver material 40 to be pulled upwardly towards a media guide 70. The upper media tray 30b also includes a cam 50b for lifting the receiver material 40 toward the upper media roller 60b which directs it towards the media guide 70.

As illustrated by the phantom position, the movable media guide 70 directs the receiver material 40 under a pair of rollers 80 which engages the receiver material 40 for assisting the upper media roller 60b in directing it onto a staging tray 90. The media guide 70 is attached and hinged to the interior of the housing 15 at one end, and is uninhibited at its other end for permitting multiple positioning of the media guide 70. The media guide 70 then rotates its uninhibited end downwardly, as illustrated by the solid line, and the direction of rotation of the upper media roller 60b is reversed for forcing the receiver material 40 resting on the staging tray 90 back under the rollers 80, upwardly through an entrance passageway 100 and around a rotatable imaging drum 110.

Four rolls of donor material 120 (only one is shown) are connected to a carousel 130 in a lower portion of the housing 15, and each roll 120 includes a donor material 120 of a different color, typically black, yellow, magenta and cyan. These donor materials are ultimately cut into sheets and passed to the imaging drum for forming a medium from which dyes imbedded therein are passed to the receiver material resting thereon, which process is described in detail herein below. In this regard, a drive mechanism 140 is attached to each roll 120, and includes three rollers 150 through which the donor material 120 of interest is rolled upwardly into a knife assembly 160. After the donor material 120 reaches a predetermined position, the rollers 150 cease driving the donor material 120 and two blades 170 positioned at the bottom portion of the knife assemble cut the donor material 120 into a sheet. The media rollers 60a and 60b and media guide 70 then pass the donor material 120 onto the drum 110 and in registration with the receiver material 40 using the same process as described above for passing the receiver material 40 onto the drum 110. The donor material 120 rests atop the receiver material 40 with a narrow gap between the two created by microbeads imbedded into the receiver material 40.

A laser assembly 180 includes twenty lasers 185 in its interior, and these lasers are connected via fiber optic cables 187 to a coupling head 190 and ultimately to a print head 200. The print head 200 creates thermal energy from the signal received from the lasers 185 causing the donor material 120 to pass its dye across the gap to the receiver material 40. The print head 200 is attached to a lead screw 210 via a nut (not shown in FIG. 1) for permitting it to move axially along the longitudinal axis of the drum 110 for writing data onto the receiver material 40.

For writing, the drum 110 rotates at a constant velocity, and the print head 200 begins at one end of the receiver material 40 and traverses the entire length of the receiver material 40 for completing the transfer process for the particular donor material resting on the receiver material 40. After the donor material 120 has completed its dye transfer, the donor material 120 is then transferred from the drum 110 and out of the housing 15 via a skive or ejection chute 210. The donor material eventually comes to rest on a donor material tray 212 for permitting removal by a user. The above-described process is then repeated for the other three rolls of donor material.

After all four sheets of donor material have transferred their dyes, the receiver material 40 is transported via a transport mechanism 220 through an entrance door 230 and into a dye binding assembly 240 where it rests against an exit door 250. The entrance door 230 is opened for permitting the receiver material 40 to enter into the dye binding assembly 240, and shuts once it comes to rest in the dye binding assembly 240. The dye binding assembly 240 heats the receiver material 40 for further binding the transferred dye on the receiver material 40 and for sealing the microbeads thereon. After heating, the exit door 250 is opened and the receiver material 40 with the image thereon passes out of the housing 15 and comes to rest against a stop 260.

Figure 2:
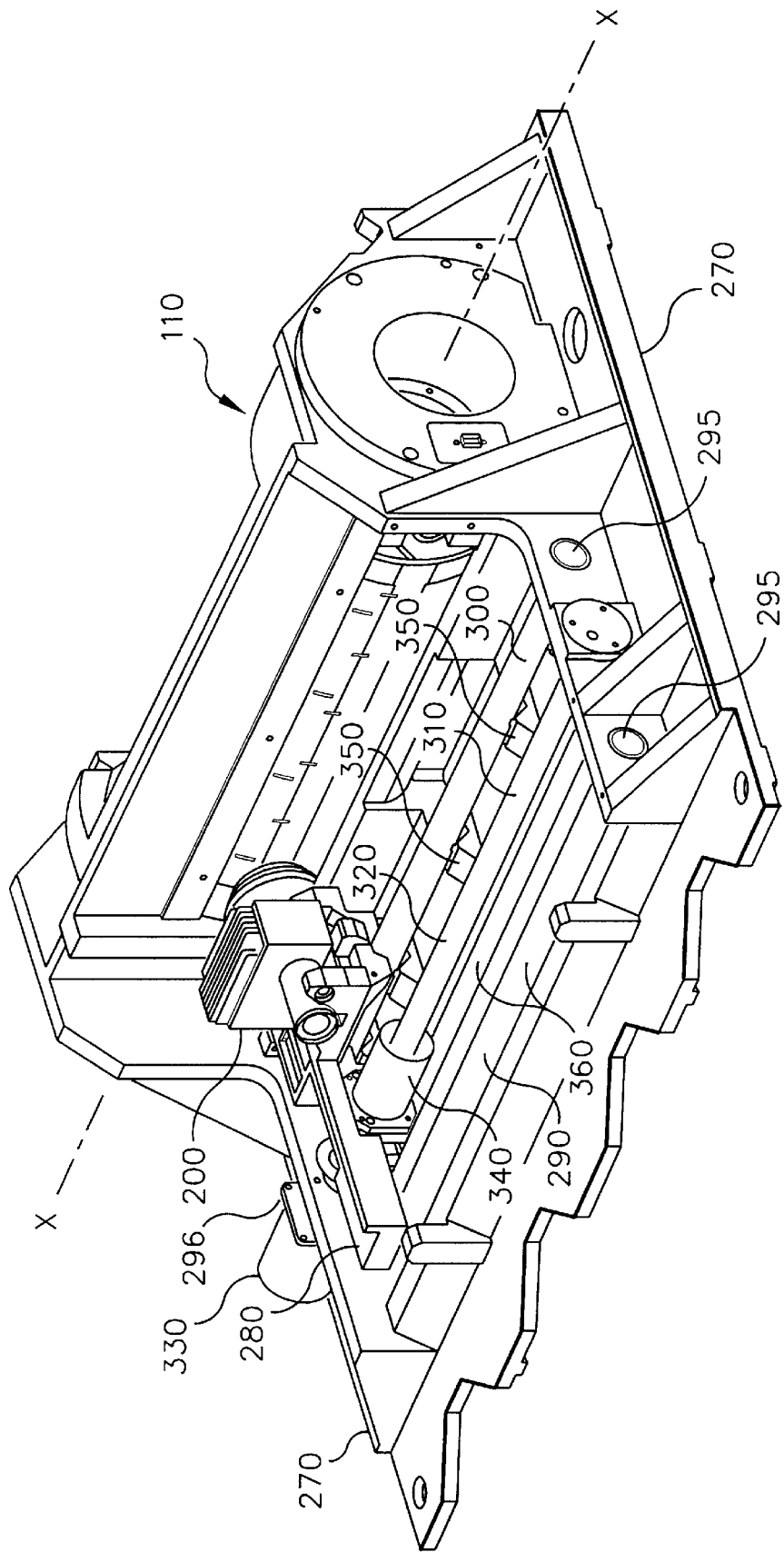
FIG. 2 is a perspective view of a portion of the lathe bed scanner illustrating an imaging drum and a print head both positioned on a frame.

Referring to FIG. 2, there is illustrated a perspective view of the imaging drum 110 and print head 200 of the lathe bed scanner 10. The imaging drum 110 is mounted for rotation about an axis (x) in a frame support 270. The print head 200 is movable with respect to the imaging drum 110, and is arranged to direct a beam of actinic light to the donor material 120 (shown in FIG. 1). The print head 200 contains therein a plurality of writing elements (not shown) which can be individually modulated by electronic signals from the laser diodes 185, which signals are representative of the shape and color of the original image, so that each dye is heated to cause volatilization only in those areas in which its presence is required on the receiver material 40 to reconstruct the color of the original object.

The print head 200 is mounted on a movable translator member 280 which, in turn, is supported for low friction slidable movement on bars 290 and 300. The bars 290 and 300 are sufficiently rigid so that they do not sag or distort between the mounting points and are arranged as parallel as possible with the axis (x) of the imaging drum 110. The upper bar 300 is arranged to locate the axis of the print head 200 precisely on the axis (x) of the drum 110 with the axis of the print head perpendicular to the drum axis (x). The upper bar 300 locates the translator member 280 in the vertical and the horizontal directions with respect to the axis of the drum 110. The lower bar 290 locates the translator member 280 only with respect to rotation of the translator about the bar 290 so that there is no over-constraint of the translator member 280 which might cause it to bind, chatter, or otherwise impart undesirable vibration to the print head 200 during the generation of an image.

The upper bar 300 is supported by a plurality of spaced-apart bosses 350 which are an integral part of the support frame 270, and a solid receiving receptacle 360, which is also integrally attached to the support frame 270, receives the lower bar 290 for supporting it within the support frame 270. The frame 270 includes two installation holes 295 on one end of the frame 270 that are respectively aligned with two installation holes 296 on the opposite ends of the frame 270 for permitting the bars 290 and 300 to be inserted and aligned therein during their installation.

A lead screw 310 includes an elongated, threaded shaft 320 which is attached to a motor 330 on its driven end and to the frame support 270 at its driven end. A nut 340 includes grooves in its hollowed-out center portion for mating with the threads of the shaft 320 for permitting the nut 340 to move axially along the shaft 320 as the nut is rotated. The nut 340 is integrally attached to the print head 200 at its periphery so that, as the shaft 320 is rotated by the motor 330, the nut moves axially along the shaft 320 which, in turn, moves the print head 200 axially along the drum.

Figure 3:
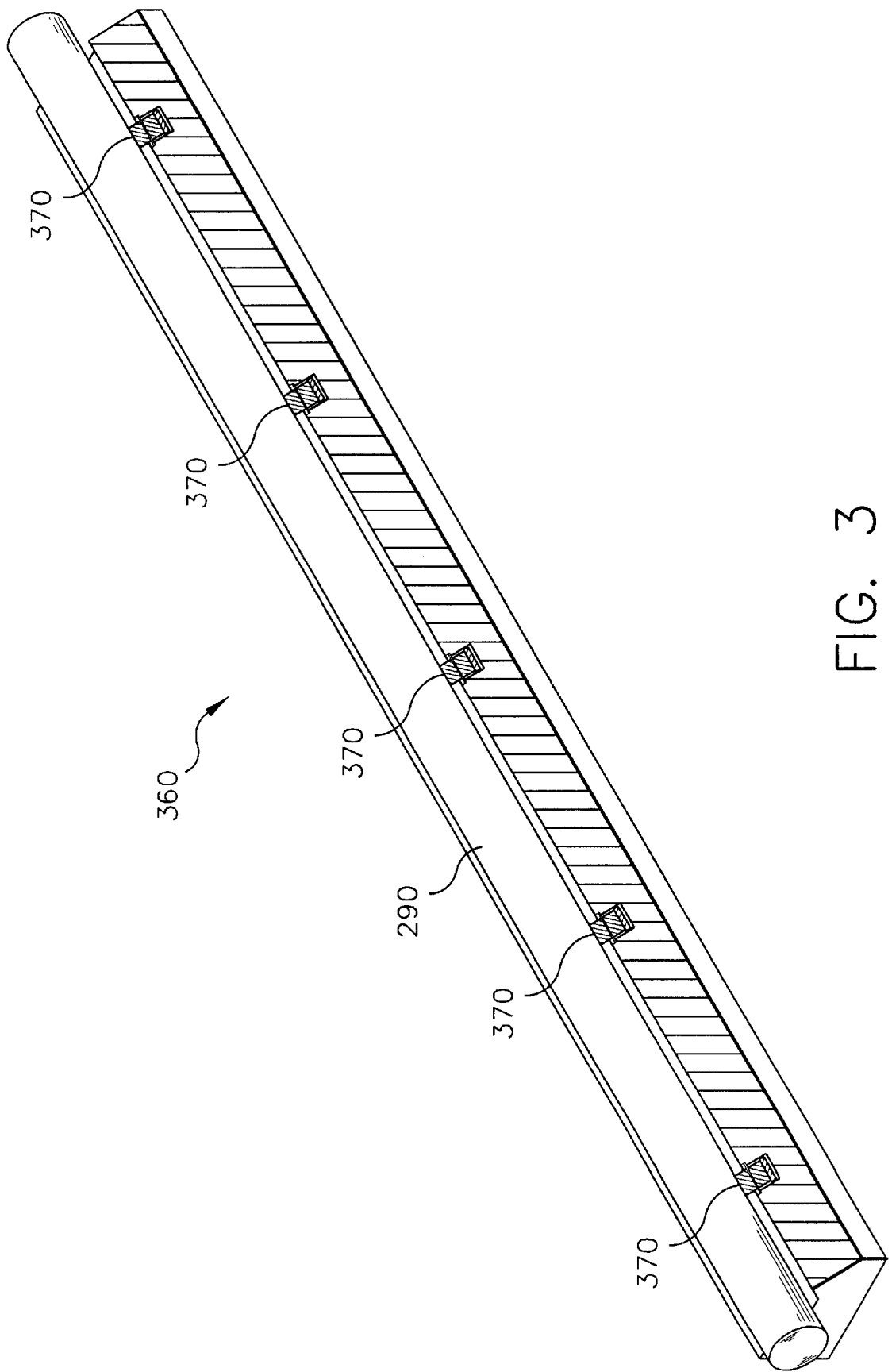
FIG. 3 is a perspective view having a portion in vertical cross section view of a portion of the frame support illustrating an apparatus for supporting the print head.
Figure 4A:
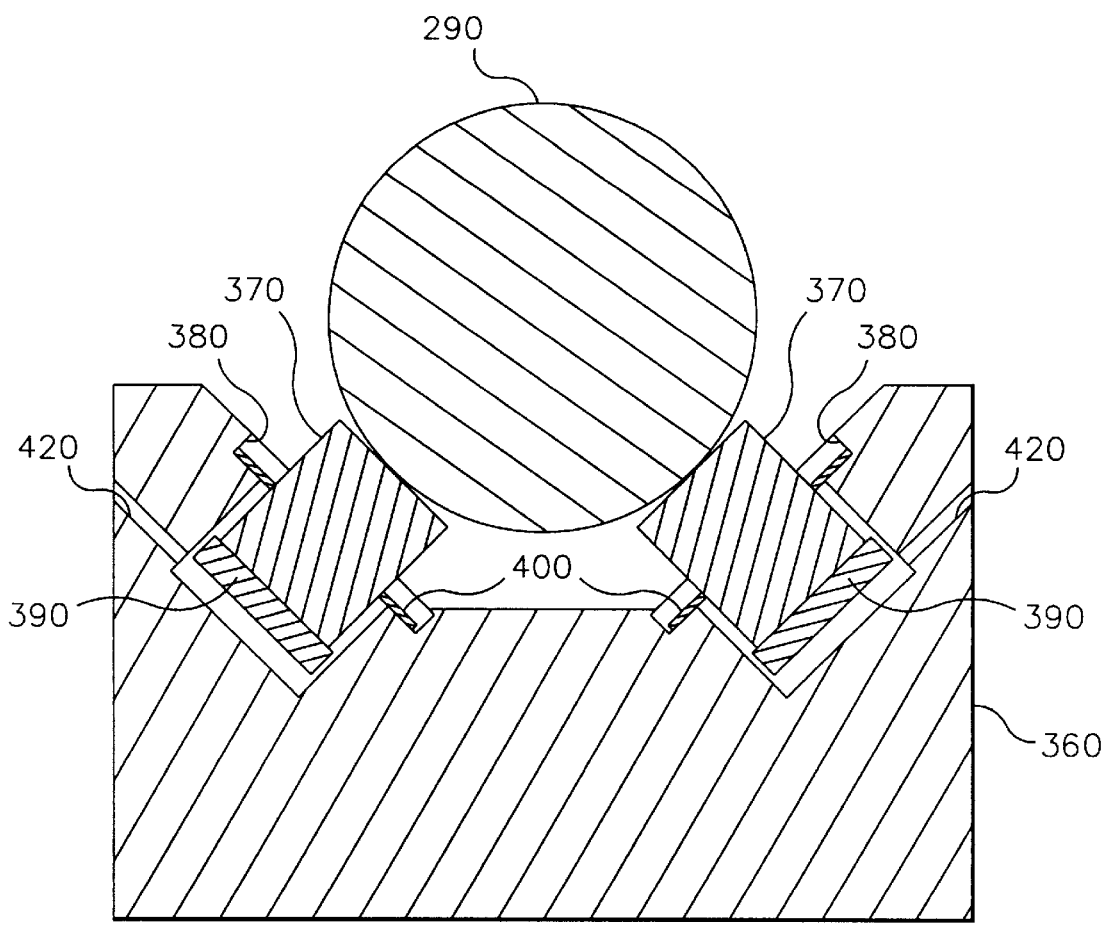
FIG. 4A is a view in vertical cross section of the support apparatus for the print head.

Referring to FIGS. 3 and 4A, an illustration of the attachment of the lower bar 290 in the solid receptacle 360 is shown. Although the attachment of the lower bar 290 is shown for the purpose of illustration, those skilled in the art will readily recognize that the upper bar 300 may also be attached by the same method and apparatus. In this regard, a plurality of neodymium iron boron (NdFeB) magnets 370 are positioned along the longitudinal axis of the receptacle 360 respectively in a plurality of circular-shaped counter-bored holes 380 for permitting the magnets 370 to receive the bar 290 by magnetic attraction. Each magnet 370 is preferably positioned directly opposite another magnet 370 on the opposite side of the receptacle 360 for forming a mated pair. Each magnet 370 also preferably includes a magnetic force of substantially four and one-half pounds, and includes a keeper 390 magnetically attached on its bottom portion for enhancing the strength of the magnet 370.

Figure 4B:
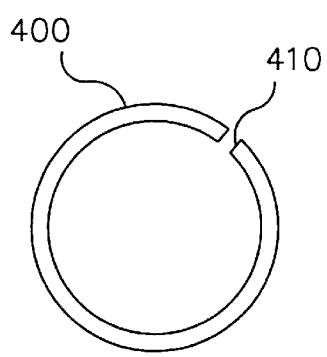
FIG. 4B is a top view of an alignment seal of the support apparatus.

A plurality of plastic, circular-shaped alignment seals 400 respectively rest on a lip of a counterbore for abuttingly receiving the magnets 370. Each alignment seal 400 is sufficiently flexible so that the magnet is manually slidable into the seal, and is also sufficiently rigid so that once the magnet is in its desired position it is retained in this position until the below-described process for rigidly attaching the magnet 370 is completed. Referring briefly to FIG. 4B, the seal 400 is preferably ten thousands of an inch in thickness, and each includes a slit 410 therein for permitting efficient installment of the magnets 370, as will be described in detail below.

Referring back to FIGS. 3 and 4A, for installing the magnets 370, an installation rod having a substantially straight longitudinal axis (a tolerance of less than five microns) is initially installed on the receptacle 360 for aligning the magnets 370 in their desired positions; the installation rod is replaced after such initial alignment by commercially available rod 290. In this regard, the installation rod is inserted into their respective installation holes and placed on the magnets 370. The installation rod is aligned parallel to the axis (x) of the imaging drum 110, by methods well known in the art. Since the installation rod is straight, the magnets 370 align themselves in a position defining a parallel axis to the axis (x) of the imaging drum for any rod placed thereon.

A fill port 420 passes into the interior of the receptacle 360 and connects with each counterbore 380 for providing a passageway for a binding solution, such as stycast epoxy, to the counterbore 380 from the exterior. With the installation rod aligning the magnets in their desired position, the binding solution is injected into the fill port 420 until the solution seeps through the slit 410 in the alignment seal 400 indicating that the portion of counterbore 380 beneath the alignment seal 400 is completely full. The seal 400 functions to contain the solution such that other counterbore orientations, upside down or horizontal orientations, may also be potted. After a period of time, the solution hardens thereby rigidly attaching the magnets 370 to the receptacle 360.

The installation rod is then removed and any commercially available rod 290 which typically includes a curvature along its longitudinal axis is placed on the magnets 370. The magnets 370 each magnetically attract the surface of the commercially available rod 290 to which it is adjacent so that the longitudinal axis of the rod 290 becomes substantially straight and parallel to the axis (x) of the imaging drum.

The above described procedure is then repeated for the upper bar 300 with the magnets 370 being positioned in the bosses 350.

The invention has been described with reference to a preferred embodiment. However, it will be appreciated that variations and modifications can be effected by a person of ordinary skill in the art without departing from the scope of the invention.

Parts List:
10 scanner
15 housing
20 door
30 media tray
40 receiver material
50 cams
60 media rollers
70 media guide
80 rollers
90 staging tray
100 entrance passageway
110 imaging drum
120 rolls of donor material
130 carousel
140 drive mechanism
150 rollers
160 knife assembly
170 blades
180 laser assembly
185 lasers
187 optic cables
190 coupling head
200 print head
210 donor material ejection chute
212 donor ejection tray
220 transport mechanism
230 entrance door
240 dye binding assembly
250 exit door
260 stop
270 frame support
280 translator member
290 bars
295 installation holes
296 installation holes
300 bars
310 lead screw
320 threaded shaft
330 motor
340 nut
350 bosses
360 receptacle
370 magnet
380 counterbore
390 keeper
400 alignment seal
410 slit
420 fill port

We claim:

1. An apparatus for maintaining the positional relationship of a print head in a lathe bed scanner, the apparatus comprising:

(a) a frame that forms a support structure for the lathe bed scanner;

(b) a first bar which supports the print head of the lathe bed scanner, and which includes an initial curvature;

(c) a receiving receptacle integrally attached to said frame;

(d) a first plurality of magnets, disposed on said receiving receptacle, each first magnets having a surface that is substantially parallel to each other on which surfaces said first bar rests and said first plurality of magnets magnetically attracting said first bar so that the curvature is straightened due to said attraction, and so that the positional relationship of said first bar and, consequently, the print head are maintained.

2. The apparatus as in claim 1 further comprising a plurality of second magnets, disposed on said receiving receptacle, each having a surface that is substantially parallel to each other on which surfaces said first bar rests and said second plurality of magnets magnetically attracting said first bar so that the curvature is straightened due to said attraction and so that the positional relationship of said first bar and, consequently, the print head are maintained.

3. The apparatus as in claim 1 further comprising a second bar having a curvature and disposed substantially parallel to said first bar for supporting the print head of the lathe bed scanner.

4. The apparatus as in claim 3 further comprising a plurality of third magnets each having a surface that is substantially parallel to each other on which surfaces said bar rests and said third plurality of magnets magnetically attracting said second bar so that the curvature of said second bar is straightened due to said attraction and so that the positional relationship of said second bar and, consequently, the print head are maintained.

5. The apparatus as in claim 1 further comprising a plurality of fourth magnets, disposed on said receiving receptacle, each having a surface that is substantially parallel to each other on which surfaces said second bar rests and said fourth plurality of magnets magnetically attracting said second bar so that the curvature is straightened due to said attraction and so that the positional relationship of said second bar and, consequently, the print head are maintained.

* * * * *